Feb. 17, 1953  F. L. MOORE ET AL  2,628,842
PORTABLE SOUND RECORDING AND REPRODUCING MACHINE
Filed May 28, 1946  8 Sheets-Sheet 1

INVENTORS,
Frank L. Moore
Willard A. Roberts
BY
Darby & Darby
ATTORNEYS,

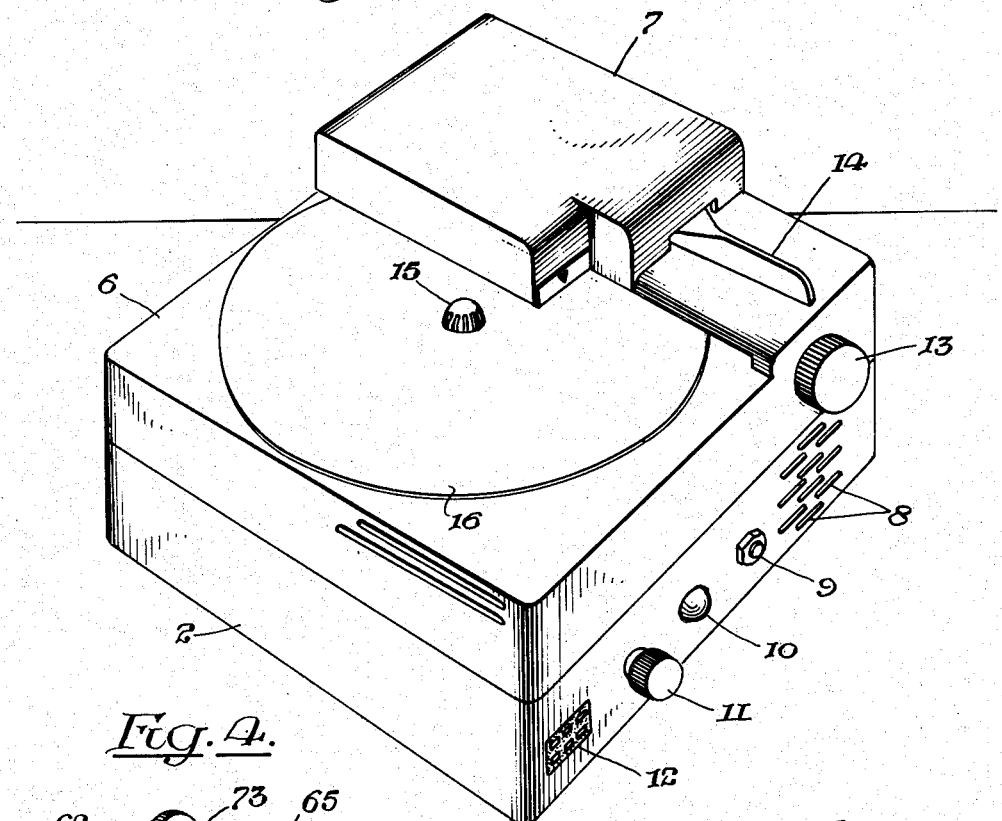
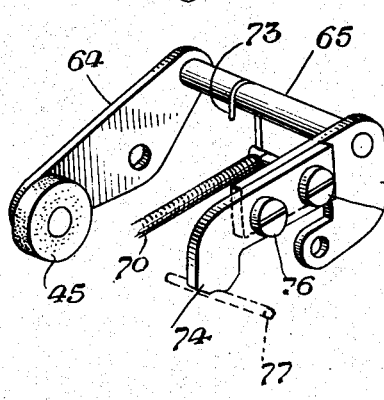
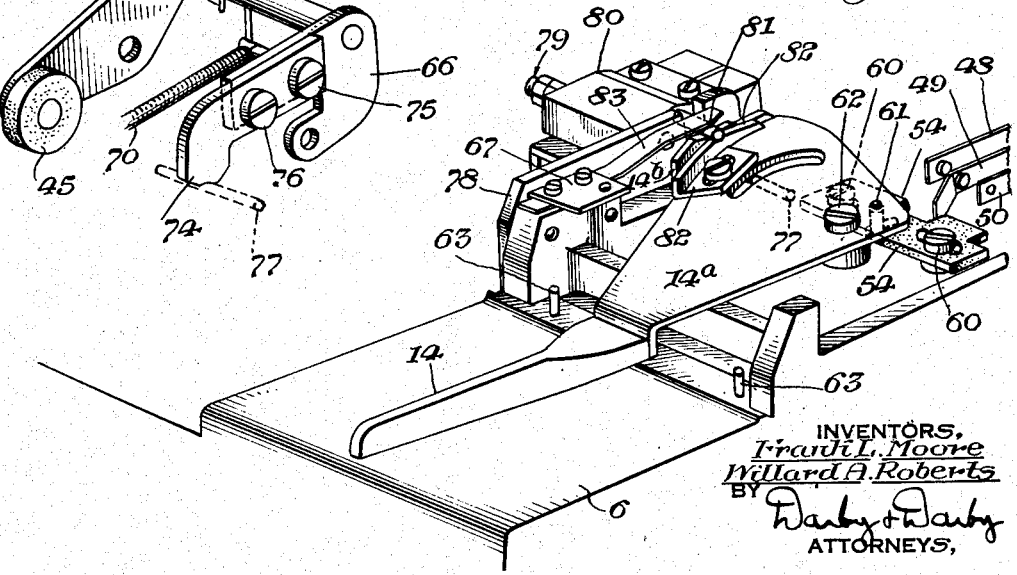

Feb. 17, 1953  F. L. MOORE ET AL  2,628,842
PORTABLE SOUND RECORDING AND REPRODUCING MACHINE
Filed May 28, 1946  8 Sheets-Sheet 3

INVENTORS,
Frank L. Moore
Willard A. Roberts
BY
Darby & Darby
ATTORNEYS.

Feb. 17, 1953 F. L. MOORE ET AL 2,628,842
PORTABLE SOUND RECORDING AND REPRODUCING MACHINE
Filed May 28, 1946 8 Sheets-Sheet 4

INVENTORS,
Frank L. Moore
Willard A. Roberts
BY
Darby & Darby
ATTORNEYS,

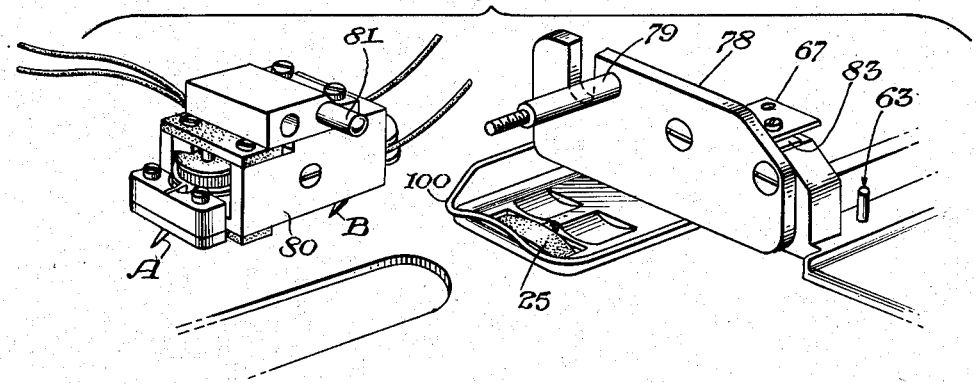
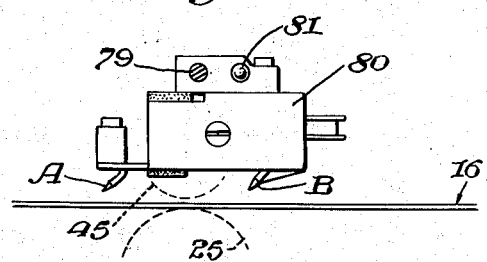
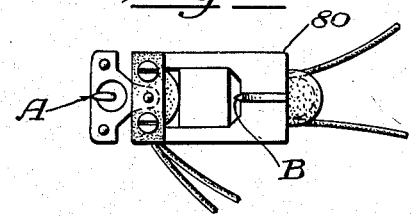
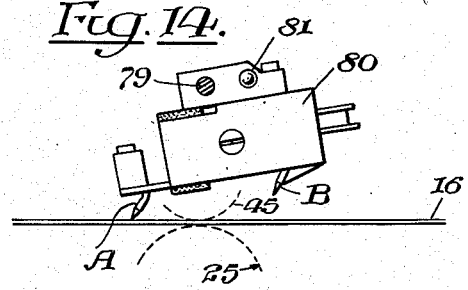
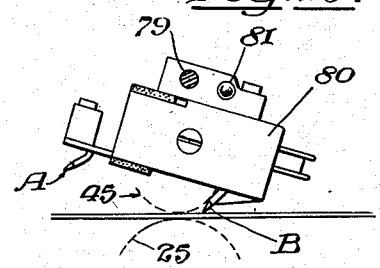
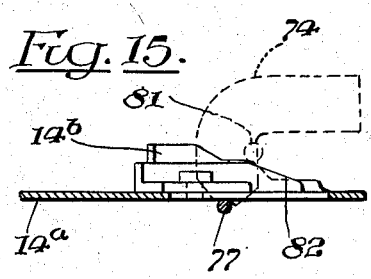

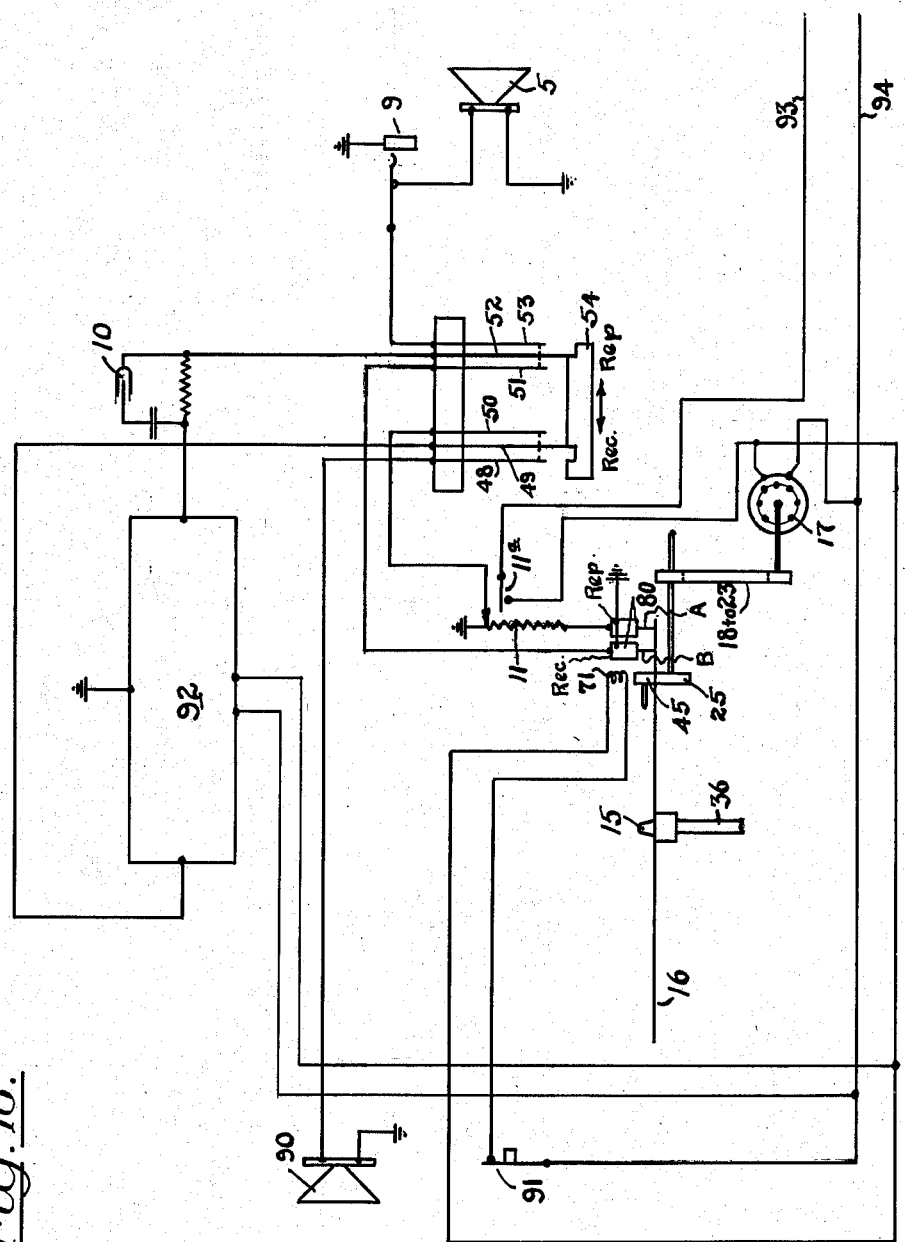

Patented Feb. 17, 1953

2,628,842

UNITED STATES PATENT OFFICE 2,628,842

PORTABLE SOUND RECORDING AND REPRODUCING MACHINE

Frank L. Moore, Hartford, and Willard A. Roberts, Wethersfield, Conn., assignors to The Gray Manufacturing Company, Hartford, Conn., a corporation of Connecticut Application May 28, 1946, Serial No. 672,808

4 Claims. (Cl. 274—9)

This invention relates to improvements in sound recording and reproducing machines and particularly portable machines subject to possible rough usage.

An important object of this invention is to provide in as compact form as possible a complete self-contained sound recording and reproducing machine all of which with the exception of the microphone and start-stop switch associated therewith is included in a single portable protective housing.

A further object of this invention is to provide a construction for a machine of this type which is quite rugged and capable of withstanding rough usage.

A still further object of the invention is to provide an arrangement of the component parts of such a mechanism whereby the components are arranged in two general groups one of which is mounted in the lower half of a two-part hinged housing and the other of which is in the upper half or cover for the lower half and becomes accessible for adjustment and repair upon opening the housing.

Another object of the invention is to provide simple controls for adapting the machine to all its usual operating conditions and placing them so as to be readily accessible for manipulation.

Another object of the invention is to provide a simple mechanism whereby the forward and back spacing operations are easily accomplished.

Another object of this invention is to provide as a part of the drive mechanism for a record carriage a friction half nut which produces effective driving of the record carriage while permitting, by means of a simple manually operated mechanism, forward and back spacing.

Another object of the mechanism is to provide a machine of this type with a built-in loudspeaker and to provide by simply plugging in for the operation of a headset or another loudspeaker placed exteriorly of the unit.

Another object of this invention is to provide an effective arrangement for maintaining the recorder-reproducer unit relatively fixed in all positions to nullify the effects of vibration and shock.

Another object is to provide a machine of this type in which a vacuum tube amplifier is employed in its entirety for recording and reproduction.

A still further object is to provide a single manual control for the machine whereby it is conditioned for neutral, recording or reproduction on the movement of the manual to any one of three positions.

A still further object is to provide a machine in which this manual also conditions the amplifier circuits for recording and reproduction.

Still another object of the invention is to provide a volume control for reproduction having a cooperating main on-and-off switch for the entire machine.

A still further object of the invention is to provide a signal lamp for indicating when the power is on the machine and whether or not the amplifier is operating properly or at all.

Another object of the invention involves the arrangement of the manual and the mechanism controlled thereby on the outer face and the cover for easy accessibility and to provide a detachable subsidiary closure therefor.

Another object of the invention is to provide a drive arrangement for the record disc which permits recording to the very edge of the disc.

Another object of this invention is to provide a single or unitary sound recording and reproducing head likewise controlled by said manual to condition that part of the mechanism for non-use, recording or reproduction.

Other and more detailed objects of the invention will be apparent from the following disclosure of the embodiment thereof illustrated in the attached drawings.

This invention resides substantially in the combination, construction, arrangement and relative location of parts as will be described in detail below.

In the accompanying drawings—

Figure 2 is a perspective view of the mechanism from the other side with the housing closed;

Figure 3 is an enlarged detailed perspective view of the manual and the recording-reproducing unit indicating how it is controlled thereby;

Figure 4 is an enlarged detailed perspective view of the mounting for the upper pressure roller;

Figure 10 is an exploded view of the recorder-reproducer unit and the mounting therefor;

Figure 11 is a bottom plan view of the recorder-reproducer unit;

Figure 12 is a side elevational view of the unit in neutral position, that is in non-operative position, showing a portion of the record blank;

Figure 13 is a view similar to Figure 12 showing the recorder-reproducer unit tilted for recording;

Figure 14 is a similar view showing the unit tilted for reproduction;

Figure 15 is an elevational diagrammatic view of a part of the mechanism for tilting one of the drive rollers for the record showing some parts in cross-section; and Figure 16 is a diagrammatic and schematic illustration of the mechanism of this invention disclosing particularly the control circuits therefor.

Figure 1:
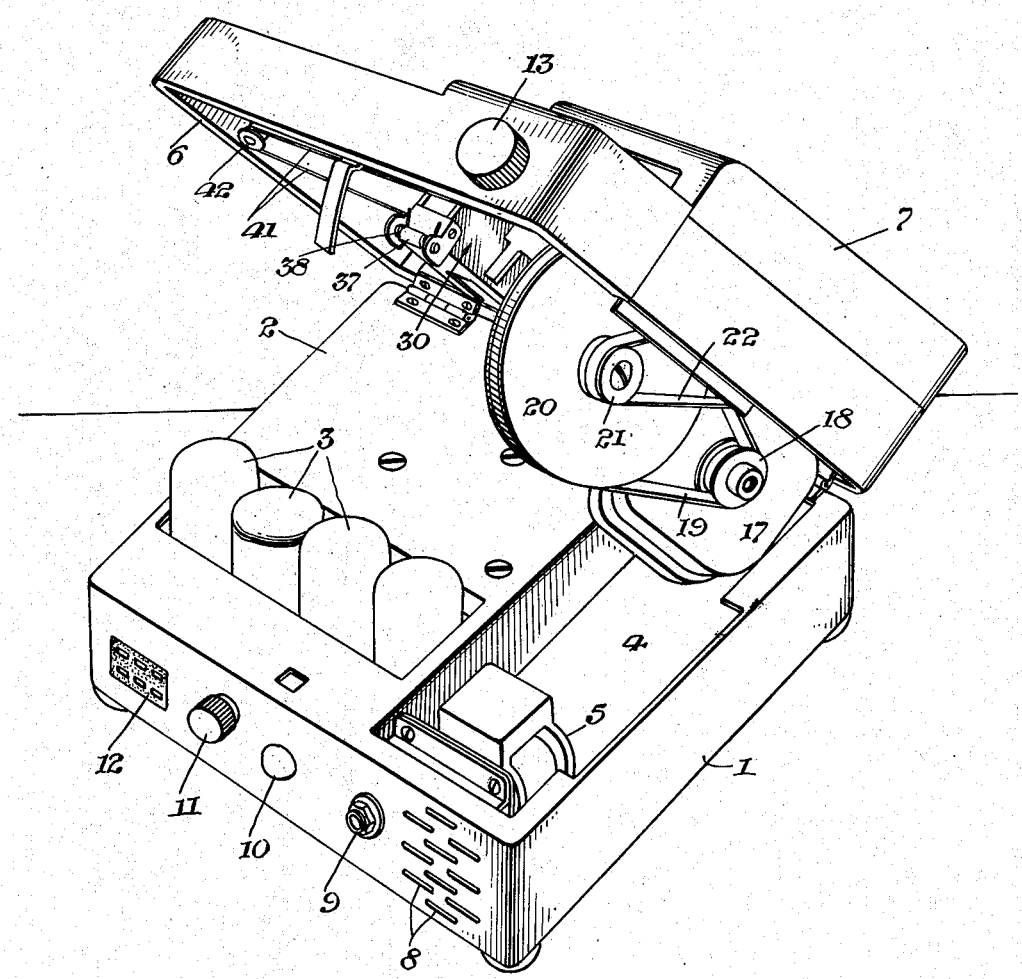
Figure 1 is a perspective view of the portable machine of this invention showing the cover of the two-part housing in partially open position to expose the interior of the housing.

The machine as illustrated in the drawings and described below is of a type employing a record blank of circular form which is impaled upon a rotatable spindle in turn mounted upon a radially translatable carriage so that as the record revolves it has a rectilinear bodily movement with respect to the recorder-reproducer unit. In such a machine the record is caused to revolve by means of a pair of friction rollers, one of which is power driven, engaging the record blank in radial alignment with respect to these rollers on opposite sides and the carriage is translated radially of the record blank by reason of the rotation imparted to the spindle upon which the blank is impaled. In this machine when in use the drive motor operates the driven friction roller continuously and the rotation of the record blank is started and stopped by moving the idler friction roller into and out of contact with the record blank. In the machine illustrated the idler roller is caused to have such movement by means of an electromagnet controlled by a simple start-stop switch at the microphone or recording station. Other characteristics of a machine of this type will become apparent from the following description.

As illustrated the housing consists of two portions 1 and 6 made of any suitable material and hingedly connected together at one end. In the design illustrated the two housing parts are about the same depth so that the housing opens on a horizontal central plane. The portion 1 of the housing is formed to provide a compartment 2 in which the amplifier and the adjuncts thereof are housed and providing an opening through which the various rectifier and vacuum tubes 3 may be inserted and removed from the usual sockets, not shown. The lower portion of the housing is also formed to provide a well 4 in the forward end of which is mounted the loudspeaker 5 which may be of any suitable type. The front wall of this part of the housing is provided with a grill 8 through which the sounds from the loudspeaker may issue. Also mounted on this wall is a jack 9 for an exterior loudspeaker or headset, the signal lamp 10, the main on-and-off switch and volume control manual 11, and the plug receptacle 12 by means of which the microphone and start-stop control circuits may be connected.

The upper part of the housing is provided with the removable closure 7 previously referred to and on the front wall of the cover 6 is the forward and backspacing manual 13. The power supply cable for the machine, not shown, may enter the lower part of the housing at any suitable point, preferably at the back. As will be seen from Figure 2, the manual for conditioning the machine for inaction, recording or reproduction is shown at 14 protruding through a slot in the front wall of the closure 7 and lying close to the adjacent upper portion of the cover 6. Also to be seen in this figure is the fluted member 15 upon which the record 16 is impaled.

Figure 5:
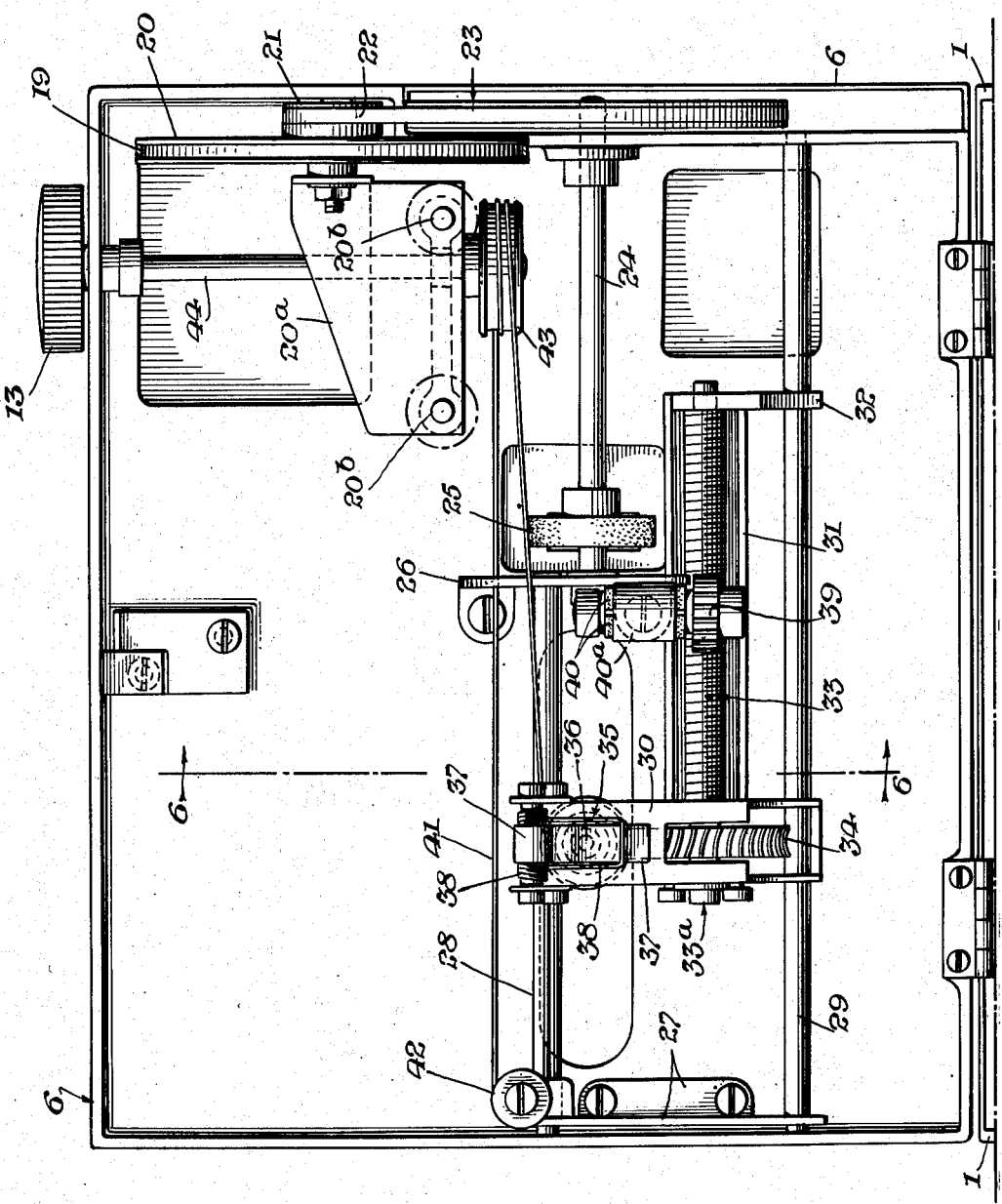
Figure 5 is a plan view of the cover of the housing when in fully open position showing many of the parts mounted thereon but omitting the driving motor and the part of the mounting therefor.
Figure 6:
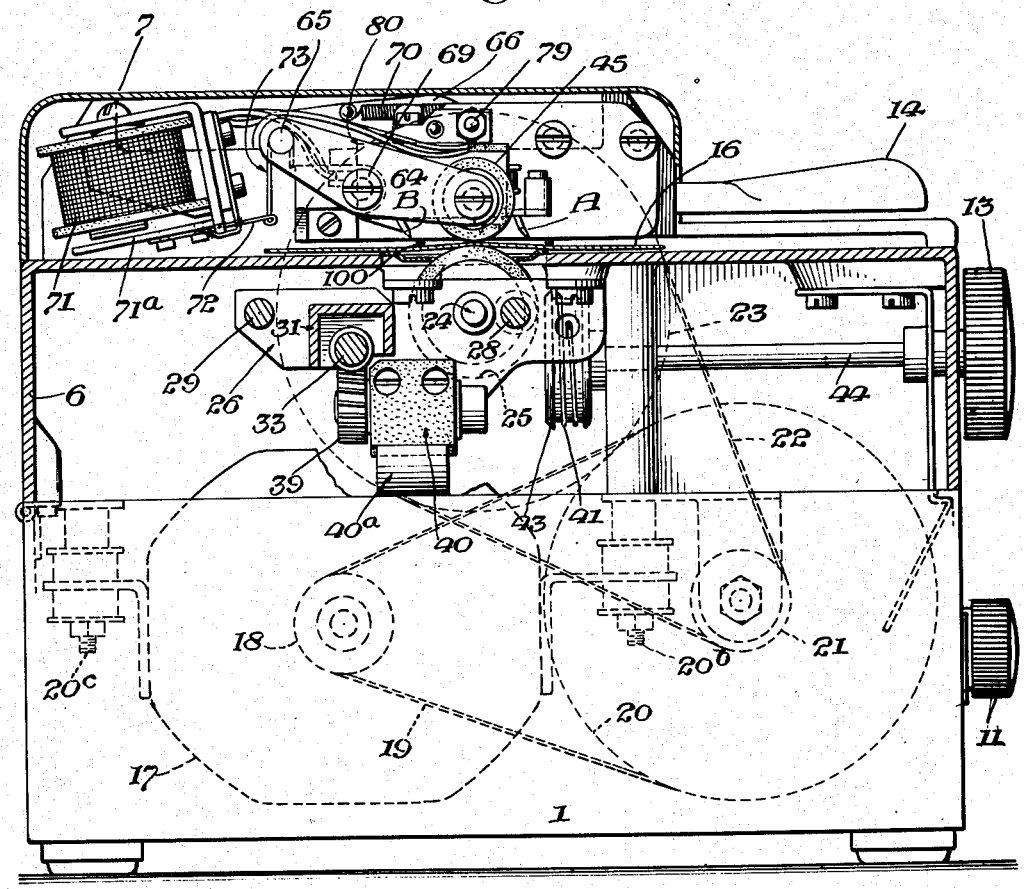
Figure 6 is a cross-sectional view taken on the line 6—6 of Figure 5.

Reference will now be made to Figure 5 in which appears most of the apparatus mounted on the inside of the cover 6, and to Figure 1. In Figure 1 appears the motor 17 which, as shown in Figures 5 and 6, is mounted on four standards 20b and 20c. Included in the mounting are resilient washers between which the motor brackets are clamped so as to absorb vibration due to the motor. The motor has a drive pulley 18 on its shaft which is connected by belt 19 to an idler pulley combination 20, 21 rotatably mounted on a shaft supported by a plate 20a (see Figure 5) also secured on the standards 20b. The smaller pulley 21 is connected by belt 22 to a larger pulley 23 mounted on a shaft 24 journalled at one end in an integral part of the cover and at the other end in a bracket 26 mounted on the inside of the cover. Also mounted on the shaft 24 for rotation therewith is the power driven friction wheel 25 which is exposed through an opening in the cover 6 (see particularly Figure 6). Over at the other side of the cover is mounted a bracket 27 which supports the ends of a pair of guide rods 28 and 29, the former of which is supported at the other end in the bracket 26 and the latter of which is supported at the other end on the cover.

Figure 7:
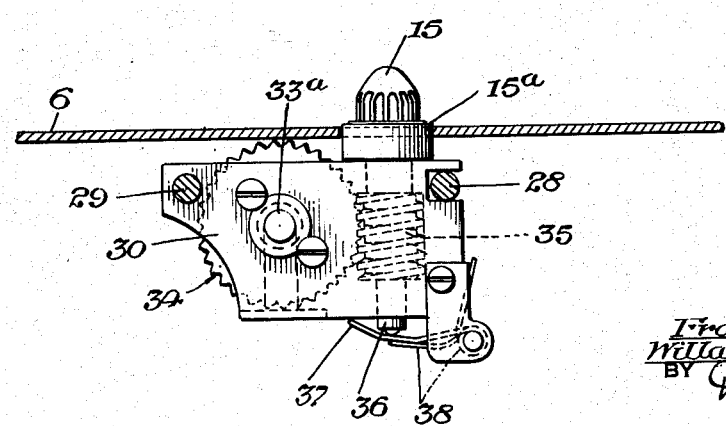
Figure 7 is an enlarged and elevational view of the record carriage showing the supporting rods and a portion of the top of the lower housing section in cross-section.

A carriage for the record spindle is provided comprising a pair of supporting members 30 and 31 secured together. The portion 30 engages the guide rods 28 and 29 (see Figure 7) and the other end of the portion 31 is provided with an extension 32 which engages the rod 29 forming a sliding support for this carriage and the associated parts. Rotatably mounted on this carriage is a threaded shaft 33 journalled at one end in the extension 32 of the carriage and at the other end in an anti-friction thrust bearing 33a so as to prevent any noticeable amount of end play in this shaft. Secured to the threaded shaft 33 for rotation with it is a wormwheel 34 which meshes with a worm 35 (see Figure 7). The worm 35 is mounted upon a shaft 36 to the upper end of which is attached the fluted member 15. The lower end of this shaft is engaged by a pivotally mounted lever 37 which contacts an anti-friction ball on the end of the shaft and is loaded by means of a spring 38. The member 15 on shaft 36 can be easily disengaged from the record by depressing the member 15 into sleeve 15a against the resistance of the spring loaded lever 37. When the fluted member 15 is pushed into the sleeve 15a the record lies against the upper edge of the sleeve so that it is stripped from the fluted member. This facilitates rapid removal of the record blank.

The threaded shaft 33 is engaged by what may be termed a threaded half nut but which is really a wormwheel 39 of slight pitch with respect to which the threaded shaft 33 may be termed a worm. The wormwheel 39 is mounted on a short shaft which is rotatably mounted in a bore in a slotted friction block 40 made of any suitable material such as fiber or the like and mounted at its upper end on the bracket 26 (see Figure 6). The other end of this block is engaged by a spring clip 40ᵃ which, therefore, causes block 40 to frictionally bind and releasably hold the shaft of the wormwheel 39 against rotation. The bore in block 40 is tight enough on the shaft of wormwheel 39 to normally hold it against rotation and spring clip 40ᵃ is provided to take up wear in the block.

As will be seen in Figure 5, a small idler pulley 42 is rotatably mounted on the bracket 27 and a flexible cord or cable 41 passes around. Both ends of this cable are attached to the carriage after the cable passes several times around a pulley 43 mounted on the shaft 44 journaled on the cover. It is to the outer end of this shaft that the forward and back spacing manual or knob 13 is mounted.

The control manual and the associated mechanism which is exposed by removal of the closure 7 will now be described. The upper idler friction roller 46 is rotatably mounted on a pivotally supported yoke (see particularly Figures 4 and 9) which comprises an arm 64, an arm 66 and a connecting member 65 all united to form a rigid U-shaped structure. One side of this structure is pivoted by means of the arm 64 on a pivot screw 69 threaded into a U-shaped bracket 68 mounted on a portion of the cover. The arm 66 is pivotally mounted on a screw attached to the cover and not appearing in Figure 9 because it lies under the screw 75. Attached to the arm 66 is an extending finger 74 which is secured thereto by means of a pair of screws 75 and 76 which permits of some longitudinal and vertical adjustment with respect to the arm 66. Thus the screws 75 and 76 pass through elongated holes in the finger 74 so that the finger 74 can be adjusted longitudinally and vertically with respect to the arm 66. As will be seen in these figures, the arm 66 is provided with a pin on which one end of a tension spring 70 is secured having its other end anchored on a plate 67 secured to the cover.

Mounted in back of this structure is an electromagnet 71 (see Figures 6 and 9) having an armature 71ᵃ pivotally supported on the frame of the magnet. This armature is provided with a resilient extension comprising a flat spring 72 which is connected by a wire link 73 with a member 65 of the pivot yoke.

Figure 9:
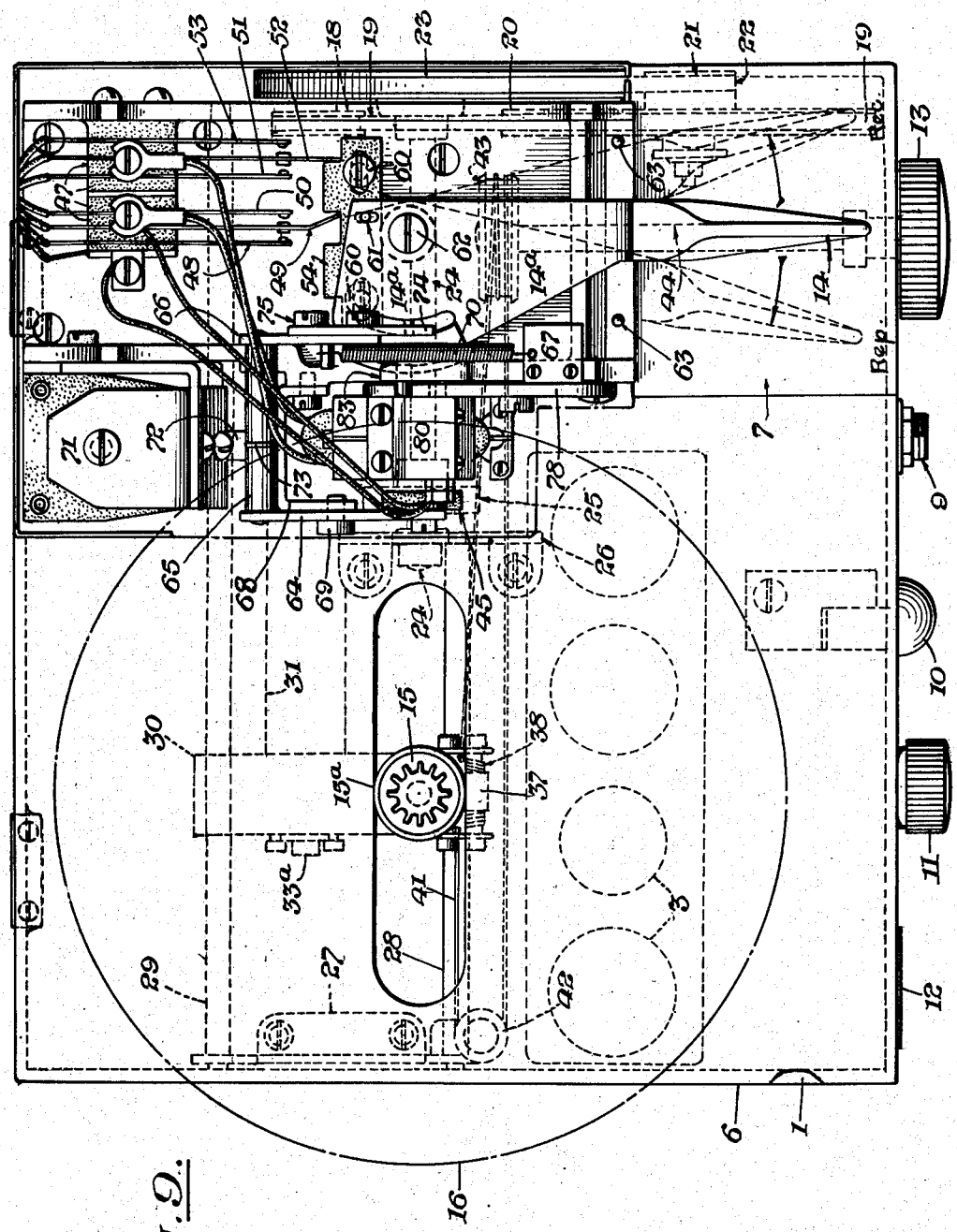
Figure 9 is a top plan view of a machine with the auxiliary closure for the manual and associated parts removed.

Mounted on the cover, as is clear from Figure 9, is an insulating support 47 upon which are mounted six spring contact fingers 48, 49, 50, 51, 52 and 53 all extending in a horizontal parallel relation. These spring fingers are arranged in two sets of three each and form single-pole double-throw switches, the fingers 49 and 52 comprising the movable contacts of the switches. They are made longer than the remaining spring fingers and cooperate with the notched slide 54 made of any suitable insulating material and slidably mounted upon a pair of screws 60 mounted in the cover 6. The slide 54 is provided with a slot into which projects a pin 61, mounted upon the expanded portion 14ᵃ of the operator 14.

This operator is pivotally mounted upon a pivot screw 62 also mounted in the cover. This manual lever is provided with an elongated arcuate slot across which extends a camming member 77 in the form of a small rod welded or otherwise attached to the underside of the lever (see Figures 3, 4, 9 and 15). This camming member 77 cooperates with the notched end of the finger 74 as appears in Figure 4.

Secured to the cover is a vertical plate 78 (see Figures 3, 6, 9 and 10) having a pivot pin 79 mounted thereon for pivotally supporting the recorder-reproducer unit 80 having the recording stylus B and the reproducing stylus A. At this point it may be noted that for the purpose of this case this unit may be considered of any suitable type such as an electrostatic, electromagnetic, or piezoelectric crystal type and the details of the construction thereof are not, therefore, shown. This unit is provided with a laterally extending pin 81 which cooperates, as is particularly clear from Figure 3, with an upright integral flange 14ᵇ having a camming surface. Mounted alongside of this flange is another camming member 82 which is secured to the portion 14ᵃ of the manual 14 by means of a screw and slot so that it may be adjusted with respect to the camming surface on the flange. Figure 15 shows the three positions to which the pin 81 is forced by these cam members for a purpose to be later described. A flattened spring 83 (see Figure 3) bears downwardly on the pin 81 and acts to hold it in contact with the camming surfaces.

The spring 83 is made sufficiently strong so that in its engagement with the pin 81 of the recorder-reproducer unit it firmly holds it against the various levels of camming surface on the cam members with which the pin engages. With this arrangement the unit 80 is maintained in all positions, namely, neutral, recording and reproducing positions, against movement with respect to the record disc due either to vibrations generated within the machine or to external shocks likely to be encountered in its use. As a result, the styli of the unit can safely be assumed to be engaging the record surface under the desired operating pressures under all disturbing forces short of destruction likely to be encountered in normal use of even a portable machine.

The wire loop 100 acts as a guide for the edge of the record blank to insure its passage into position between the wheels 25 and 45 (see Figure 10).

The subject matter of Figure 16 will now be described. In this figure the record blank 16 is diagrammatically illustrated impaled upon the member 15 which in turn is mounted on the worm shaft 36. The friction idler wheel 45 and the cooperating power driven friction wheel 25 driven by the belt and pulley system comprising the elements 18 to 23 inclusive and connected to the motor 17 are diagrammatically illustrative of the mechanism previously described. The single-pole double-throw switches and the operator 54 are also illustrated as well as the loudspeaker 5 and the headphone jack 9. The amplifier is diagrammatically illustrated at 92 which is sufficient for this disclosure in view of the fact that there are many forms of vacuum tube amplifiers suitable for the purpose. The microphone is shown at 90 and the start-stop switch at 91. The volume control is illustrated at 11 and the main on-and-off switch operated by the manual thereof is shown at 11ᵃ. The recorder-reproducer unit is shown at 80 and the control magnet at 71.

The circuit wires 93 and 94 are provided for connecting the machine to any suitable current source such as the usual lighting circuit. Wire 93 extends to the movable contact of switch 11ᵃ. Its fixed contact is connected to one side of the motor 17 and to one terminal of the start-stop magnet 71 and to the amplifier 92. The other terminal of this magnet is connected to the fixed contact of the normally closed start-stop switch 91. The movable contact of this switch returns to the other side of the power source by means of the circuit wire 94 to which the other terminal of the motor 17 and the other power terminal of the amplifier are connected. One terminal of each of the operating portions of the recorder-producer unit 80 is grounded as shown. The right-hand element of this unit, which is the reproducing element, has its other terminal connected through the variable resistor 11 to spring finger 50 by way of the movable contact of the volume control. Spring finger 49 is connected to the input of the amplifier 92 and the output is connected to the spring finger 52 and includes suitable provision for the gas-discharge signal lamp 10. Spring finger 48 is connected to ground through the microphone 90 which is positioned adjacent the start-stop switch 91. Spring finger 51 is connected to the other terminal of the recording portion of the unit 80. Spring finger 53 is connected through the switch of the plug jack 9 to the loudspeaker 5 which is grounded as shown.

A description of the operation of the mechanical portion of the mechanism and of the operation of the electrical circuit will now be given. Assuming that the power supply cables represented by the leads 93 and 94 are connected to a suitable power source and the microphone and the control switch 91 are connected in circuit by way of plug receptacle 12 the machine is ready for operation. When inactive the manual 14 is in neutral position.

Figure 8:
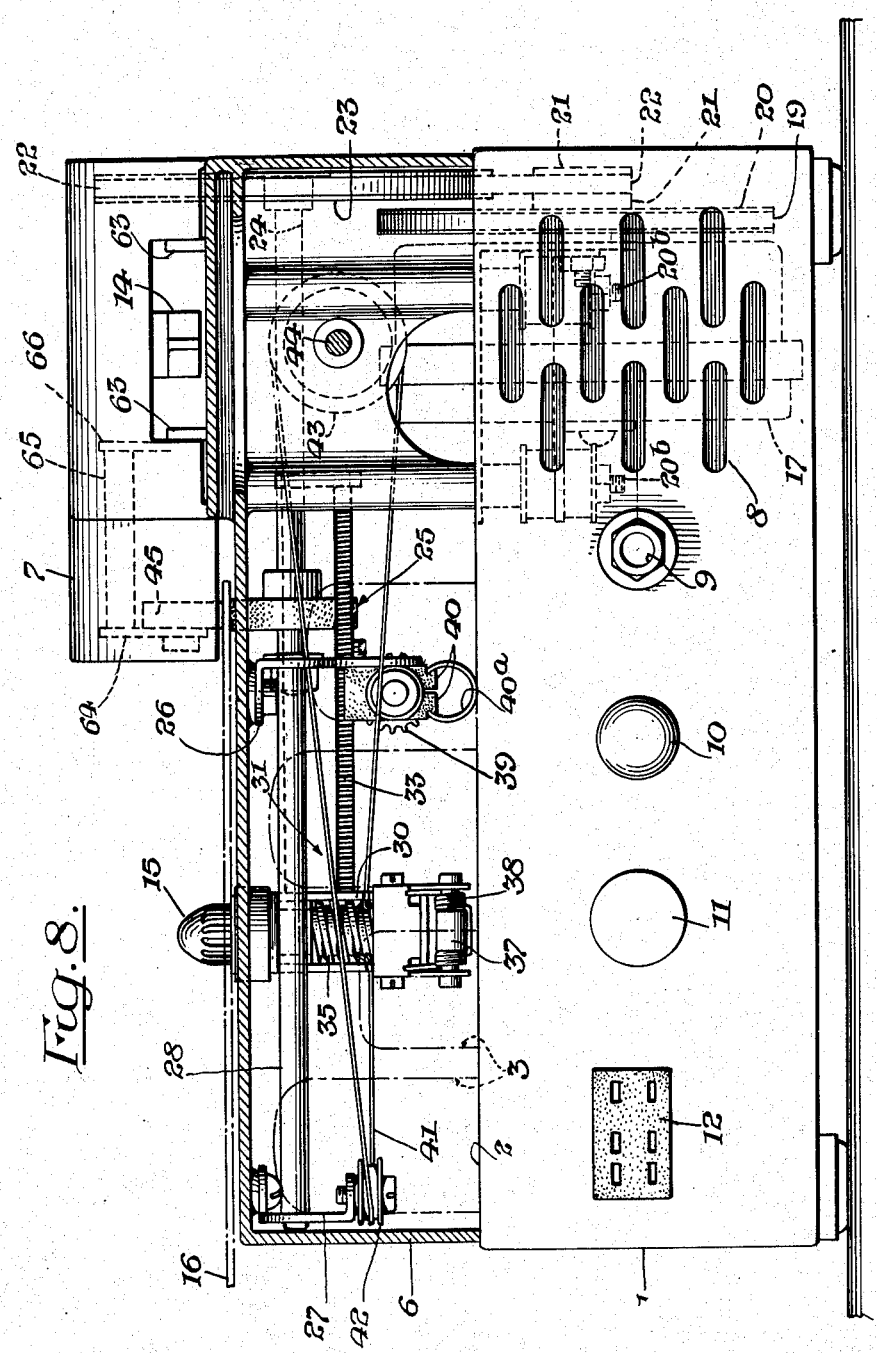
Figure 8 is a front elevational view of the machine with the upper cover in cross-section at the very front to show the mechanism mounted within the cover in elevation.

For recording purposes a blank record is impaled upon the fluted member 15. To do this easily the knob 13 is rotated in a clockwise direction (Figure 2) so that the carriage on which the member 15 is mounted moves all the way to the left. This movement of the carriage is caused by reason of the fact that rotation of knob 13 causes shaft 44 and pulley 43 to likewise turn clockwise (see Figure 8). This movement of pulley 43 through the cable 41 pulls the carriage to the left during which motion the friction half nut turns freely in the friction block 40. In other words, it is caused to revolve in a counterclockwise direction by the longitudinal movement of the threaded shaft 33. The record blank which is preferably of thin flexible material is then impaled upon the fluted member 15 having as it does a serrated central opening. The edge of the blank is passed under the spring member 100 and between the rollers 25 and 45 which are separated at this time (see Figure 12).

To prepare the machine for reproducing the knob 13 is rotated in a counterclockwise direction moving the carriage to the right and positioning the record disc so that the styli, which are aligned front and back, are near the center of the disc. The manual 14, which should have been in central position during positioning of the record disc, is moved to the left-hand dotted position shown in Figure 9, in which event spring finger 49 engages spring finger 50 and spring finger 52 engages spring finger 53. This result is caused by the fact that movement of the manual 14 to the left causes the operator 54 to slide to the right. Spring finger 49 is normally biased so that it will follow this movement of the operator while spring finger 52 is biased in the opposite direction so that it will be forced to this position by the operator. At the same time the high point of cam flange 14ᵇ has moved under the pin 81 so that the unit 80 is moved to the position shown in Figure 14 with the result that the reproducing stylus A engages the record 16. The camming member 77 on the lever 14 is moved back with relation to the finger 74 from the normal central position shown in Figure 4 so that spring 70 rotates the yoke 64—65—66 in a direction to move the idler roller 45 down into engagement with the record blank. Thus the record disc is firmly gripped between the friction rollers 25 and 45, which are preferably of high friction material such as rubber, leather and the like, or of some other material surfaced with these high friction materials, to provide a good driving engagement with the record blank.

The machine is now ready for reproducing but electrically not yet energized. To energize the machine the on and off switch 11 must be closed by turning the knob 11 of the volume control, the initial movement of which closes switch 11ᵃ which is of the type which remains closed until again positively opened. Continued movement of the knob 11 will vary the amount of the resistance 11 in the circuit to provide a volume control as will be later described. The closing of switch 11ᵃ immediately puts current on the start-stop magnet 71 as follows: from wire 93 through closed switch 11ᵃ to one terminal of the magnet 71, from the other terminal through normally closed start-stop switch 91 and back to the other side of the current source. The energization of magnet 71 (see Figure 6) attracts the pivoted armature 71ᵃ and acting through the spring lever 72 and link 73 pulls downwardly on the yoke supporting the idler roller 45 causing it to rotate in a counterclockwise direction (Figure 6). This raises the friction roller 45 out of contact with the record blank 16. At the same time amplifier 92 is energized as well as motor 17, which causes the driving friction roller 25 to rotate. However, this roller does not cause the blank 16 to revolve since it slips, there being no gripping pressure on it. In order to start reproduction the user operates switch 91 so that it opens, de-energizing magnet 71. This switch may be the type that must be held open during all dictation or of the type which will stay open until released.

The machine is now reproducing as the stylus A of the reproducer portion of the unit is being vibrated by the record groove and generating currents which are transmitted through the volume control 11 to spring finger 50, spring finger 49 which now engages it, and thence to the input of the amplifier 92. From the output of the amplifier the current passes to spring finger 52 and thence to spring finger 53 which it is now engaging and from there through the loudspeaker to ground. The volume of the output of the loudspeaker can be controlled by the volume control 11. When desired a headset can be plugged in at 9 which would be particularly desirable for a transcribing operator by whom the dictated matter is to be transcribed. Of course, another loudspeaker could be plugged in if any reason for its use arises. During reproduction the machine can be stopped and started by alternately closing and opening switch 91.

The current to the machine can be interrupted by turning the volume control 11 off which causes switch 11a to open.

The machine can be conditioned for recording by moving the manual 14 to the right, that is the right-hand dotted position (Figure 9). The movement of this manual to this position causes the operator 45 to slide to its left-hand position so that biased spring finger 49 is made to engage spring finger 48 and biased spring finger 52 engages spring finger 51. If desired the record can be spaced in either direction to a desired position by rotating the knob 13 in the appropriate direction, as previously explained. When the manual is moved to this position it causes camming member 77 to move forwardly of the finger 74 so that the yoke supporting the idler roller 45 can again be pulled by spring 70 to a position where that roller grips the record. This movement of the manual 14 also moves cams 14b and 82 forwardly so that the pin 81 can drop to the low point, whereupon the unit 80 moves to the recording position shown in Figure 13 at which time stylus B engages the record. At this point it can be noted that cam 82 is simply an auxiliary cam which can be adjusted with respect to the cam 14b to give an adjustment which would not otherwise be present as the cam 14b is an integral unadjustable part of the mechanism. By moving cam 82 with respect to the corresponding surface of cam 14b and with special relation to the lowest part thereof it is possible to adjust the position of the recording unit with respect to the record blank so that its stylus B will engage the blank under the proper pressure. Assuming that switch 11a is closed the idler roller 25 does not grip the record, since switch 91 is closed and magnet 71 is energized.

To start recording the operator opens switch 91 de-energizing magnet 71, thus permitting the idler roller 45 to grip the record. The dictator then speaks into the microphone 90 generating currents which flow from the microphone to spring finger 48, then to 49 which engages it and from there to the input of amplifier 92. The output of the amplifier is connected through signal lamp 10 to spring finger 52 and from there to spring finger 51 which engages it, and finally from that finger to the grounded recording portion of the unit 80 which is the left hand element of Figure 16. These currents set the recording unit into vibration and by means of its stylus B impresses or cuts a record on the blank 16. The operation of the signal lamp will show the dictator that all circuits are energized and that the amplifier is operating. At any time the dictator may interrupt his dictation and stop the machine by simply closing switch 91, thereby energizing magnet 71 to raise the idler roller 45. Under these conditions the motor 17 continues to operate the drive roller 25.

With regard to backspacing, it may be noted that, in reproducing, the record can be backspaced whether or not the reproducing stylus A engages the record since it engages it under such light pressure that its movement across the record groove does not seriously damage the groove. However, the record blank should not be backspaced when the recording stylus engages the record because it engages it under such relatively heavy pressure that it would damage the record groove. However, the record blank can be forward spaced with the recording stylus engaging the blank without damage to the record. This forward spacing leaves a narrow bar which may be used for reference purposes.

When the manual 14 is moved to central position the single-pole double-throw switches are in the position shown in Figure 16, the unit 80 is in neutral position shown in Figure 12 because the pin 81 is resting on the cam 14b at the level which accomplishes this and roller 45 is raised because the notch in the end of the finger 74 (see Figure 4) engages the camming pin 77 which is the position of these parts as illustrated in this figure.

While it is well known in the art, the movement of the record rotationally and bodily in a radial direction will be described. With the rollers 45 and 25 gripping the disc it will be caused to revolve, and as it is impaled on the member 15, shaft 36 and worm 35 (Figure 7) revolve. This causes wormwheel 34 and the connected threaded shaft 33 to revolve. Under these conditions the friction halfnut or wormwheel 39 does not turn because of the friction created by the friction block 40 under the action of spring 40a. Thus the halfnut 39 forms for this purpose a rigid abutment against which the turning of shaft 33 will result in a reaction which causes the carriage upon which the member 15 and associated parts is mounted to move slowly from the right hand position to the left hand position so that recording which begins near the center of the disc proceeds in a spiral path of gradually increasing radius from the center to the periphery of the record. As previously mentioned the carriage can be manually positioned by turning the knob 13 in the desired direction whereupon the friction between the blocks 40 and the shaft of the halfnut 39 is overcome and it rotates freely driven by the threaded shaft 33 as the carriage moves.

It is now, of course, apparent how a previously fully recorded record can be placed upon the machine and played back by simply moving the manual 14 to its left hand position and closing switch 11a.

By way of review for purposes of emphasis several of the important features of the machine will be again referred to. In the first place, magnet 71 is not energized during recording or reproducing thereby eliminating a possible source of electrical disturbance in the circuits of the machine. With the compact design herein disclosed the parts are so closely related in a physical sense that there is a strong possibility of undesired electrical pick-up and feed back so that a possible source thereof is completely eliminated by arranging matters so that magnet 71 is only energized during the inactive periods of the machine.

Another important feature is the manner of supporting and controlling the recorder-reproducer unit to adapt it for all of its intended functions by actual movement thereof and yet protect it against undesired movements arising for any reason. Obviously in a machine of this type the pressure with which the styli engage the record blank is important to good results, and it is quickly obvious that this pressure can be disturbed by self-created vibrations in the machine or externally applied shocks. The structure disclosed protects the machine against all normally anticipated disturbances of this kind while maintaining the proper recording and reproducing pressures between the styli and the record.

Finally, as will best be seen from Figure 9, the driving pressure rollers 25 and 45 are placed to the left of the unitt 80 making it possible to record to the very edge of the disc and similarly to reproduce from the record to the very edge of the disc without interfering with the drive of the machine. The drive pressure rollers lying between the axis of rotation of the disc and the unit 80 makes this possible.

From the above description it will be apparent to those skilled in the art that many of the features of this invention are capable of variation without departure from the novel subject matter and combinations therein disclosed and we do not, therefore, desire to be strictly limited to the disclosure as given in an illustrative sense but rather to the scope of the claims granted us.

What is claimed is:

1. A sound translating machine comprising a frame, a record carriage mounted on said frame for relative rectilinear movement, a worm rotatably mounted in said carriage and rectilinearly movable therewith, a worm wheel engaging said worm, a shaft secured to said worm wheel and projecting therebeyond, means supporting said shaft for rotation with respect to said frame, a brake acting on a projecting portion of said shaft with a force sufficient to prevent rotation of said worm wheel under reactive forces produced by rotation of said worm, a carriage shifting control member carried by said frame and rotatable about an axis fixed with respect to said frame, and a force converting mechanism interconnecting said control member and carriage for transmitting forces to said carriage sufficient to overcome the force of said brake and rotate said worm wheel and impart relatively small rectilinear movements to said carriage.

2. A sound translating machine comprising a frame, a record carriage mounted on said frame for relative rectilinear movement, a worm rotatably mounted in said carriage and rectilinearly movable therewith, a worm wheel engaging said worm, a shaft secured to said worm wheel and projecting therebeyond, means supporting said shaft for rotation with respect to said frame, a brake acting on a projecting portion of said shaft with a force sufficient to prevent rotation of said worm wheel under reactive forces produced by rotation of said worm, a remote shifting member movable about an axis fixed relative to said frame for transmitting forces to said shaft exceeding the force of said brake, and a force converting mechanism interconnecting said remote shifting member with said carriage for imparting relatively small rectilinear movements to said carriage.

3. A sound translating machine comprising a frame, a record carriage mounted on said frame for relative rectilinear movement, a worm rotatably mounted in said carriage and rectilinearly movable therewith, a worm wheel engaging said worm, a rotary shaft secured to said worm wheel, a brake member carried by said frame and embracing asid shaft, a rotary carriage adjusting shaft journaled in said frame about an axis fixed with respect to said frame and substantially parallel to the first said shaft, and a force transmitting member connecting the second said shaft and carriage, said brake acting on the worm wheel shaft with a force sufficient to prevent rotation of said worm wheel under reactive forces produced by rotation of said worm, said brake yielding under forces applied by said carriage adjusting shaft to permit rotation of said worm wheel shaft.

4. A sound translating machine comprising a frame, a record carriage mounted on said frame for relative rectilinear movement, a worm rotatably mounted in said carriage and rectilinearly movable therewith, a worm wheel engaging said worm, a rotary shaft secured to said worm wheel, a brake member carried by said frame and embracing said shaft, a rotary carriage adjusting shaft journaled in said frame about an axis fixed with respect to said frame, and a force transmitting member connecting the second said shaft and carriage, said brake acting on the worm wheel shaft with a force sufficient to prevent rotation of said worm wheel under reactive forces produced by rotation of said worm, said brake yielding under forces applied by said carriage adjusting shaft to permit rotation of said worm wheel shaft.

FRANK L. MOORE.
WILLARD A. ROBERTS.

REFERENCES CITED

The following references are of record in the file of this patent:

UNITED STATES PATENTS

| Number | Name | Date |
|---|---|---|
| 1,708,344 | Winkler | Apr. 9, 1932 |
| 1,902,950 | Dally | Mar. 28, 1933 |
| 1,934,984 | Loshbaugh | Nov. 14, 1933 |
| 2,051,792 | Beard et al. | Aug. 18, 1936 |
| 2,154,048 | La Forest | Apr. 11, 1939 |
| 2,286,015 | Schneider | June 9, 1942 |
| 2,293,217 | Rieber | Aug. 18, 1942 |
| 2,295,712 | Brown | Sept. 15, 1942 |
| 2,310,545 | Rieber | Feb. 9, 1943 |
| 2,322,467 | Proctor | June 22, 1943 |
| 2,326,625 | Di Toro | Aug. 10, 1943 |
| 2,357,033 | Thompson | Aug. 29, 1944 |
| 2,378,509 | Stephan | June 19, 1945 |
| 2,382,607 | Clausen | Aug. 14, 1945 |
| 2,387,010 | Clausen | Oct. 16, 1945 |
| 2,391,784 | Johnston | Dec. 25, 1945 |
| 2,409,520 | Thompson | Oct. 15, 1946 |